(12) United States Patent
Saito

(10) Patent No.: US 8,711,126 B2
(45) Date of Patent: Apr. 29, 2014

(54) OPTICAL INPUT DEVICE

(75) Inventor: Jun Saito, Iwate-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 132 days.

(21) Appl. No.: 13/422,958

(22) Filed: Mar. 16, 2012

(65) Prior Publication Data

US 2013/0044057 A1 Feb. 21, 2013

(30) Foreign Application Priority Data

Aug. 18, 2011 (JP) ................................ 2011-179100

(51) Int. Cl.
*G06F 3/042* (2006.01)

(52) U.S. Cl.
USPC ........................................................ 345/175

(58) Field of Classification Search
CPC .......... G06F 3/042; G06F 3/041; G06F 3/038
USPC ........................... 345/175, 173, 166, 163, 207
See application file for complete search history.

(56) References Cited

U.S. PATENT DOCUMENTS

| | | | |
|---|---|---|---|
| 6,208,330 B1 * | 3/2001 | Hasegawa et al. ............ | 345/173 |
| 8,350,973 B2 * | 1/2013 | Miyazaki et al. .............. | 349/12 |
| 8,416,227 B2 * | 4/2013 | Fujioka et al. ................ | 345/207 |
| 2006/0034043 A1 * | 2/2006 | Hisano et al. ................. | 361/681 |
| 2010/0283765 A1 * | 11/2010 | Gotoh et al. .................. | 345/175 |
| 2010/0289784 A1 * | 11/2010 | Fujioka et al. ................ | 345/207 |

FOREIGN PATENT DOCUMENTS

| | | |
|---|---|---|
| JP | 11-282607 | 10/1999 |
| JP | 2010-204765 | 9/2010 |

* cited by examiner

*Primary Examiner* — Fred Tzeng

(74) *Attorney, Agent, or Firm* — Oblon, Spivak, McClelland, Maier & Neustadt, L.L.P.

(57) ABSTRACT

A specific information input region (B) individually specifying information to be input and an input mode switching region (C) used for changing an information input mode are placed on an information input region (A) set on a substrate. Each of these regions is displayed to be visible. An optical sensor detects a touched position on the information input region. Then, the touch operation in the input mode switching region (C) is detected according to the output of the optical sensor to selectively switch the information input mode among keyboard input, pen tablet input and mouse input. The output of the optical sensor is analyzed according to the set input mode to find out the information input by the touch operation.

11 Claims, 3 Drawing Sheets

OPTICAL INPUT DEVICE

CROSS-REFERENCE TO RELATED APPLICATION

This application is based upon and claims the benefit of priority from Japan Patent Application 2011-179100 filed on Aug. 18, 2011, the entire contents of which are incorporated herein by reference.

FIELD

Embodiments of the present invention relate to an optical input device capable of inputting various types of information by switching the information input mode.

BACKGROUND

Examples of an input device for inputting information to an information processing apparatus such as a personal computer (PC) are typically a keyboard (keypad) for inputting character information, a pen tablet for inputting image information and a mouse for inputting positional information. These input devices are appropriately selected and used depending on the purpose. More specifically, an input device depending on the type of information to be input is selectively connected to a PC in each case. Alternatively, information is input to a PC through various types of input devices selectively connected to the PC.

On the other hand, it has been proposed that a detachable input unit having a keyboard and a mouse on the upper surface and a tablet on the rear surface is used by arbitrarily turning upside down so that information can be input in various form depending on the purpose. Further, it has been proposed that an input function of a touch screen (touch panel) is selectively switched by changing the display on the touch screen display.

However, the above-mentioned related art needs to prepare the various types of input devices depending on various types of the information to be input. This kind of situation inevitably causes the high cost of equipment. Further, the input devices need to be placed near the PC. Therefore, there is a problem of the space for installation. Furthermore, it is necessary to selectively connect the input device to be used to the PC according to the input device to be used. Thus, the handling becomes difficult.

SUMMARY OF THE INVENTION

To achieve the above-mentioned objective, the optical input device according to the present embodiment includes a substrate for defining an information input region by a touch operation; an optical sensor configured to optically scan the information input region and to detect a position on the substrate at which selective touch is performed; a region setting means configured to define a specific information input region for individually specifying information to be input and an input mode switching region for selecting an information input mode in the information input region in a visible form; an input mode switching unit configured to detect the touch operation in the input mode switching region in an output of the optical sensor and to select one of the input modes out of a plurality of previously set input modes; and an input processing unit for analyzing the output of the optical sensor according to the input mode selected in the input mode switching unit to find out the information input by the touch operation in the information input region.

Here, the plurality of input modes includes a keyboard input operation in which a plurality of small regions set in the specific information input region is used as a keyboard region adapted to each of various characters/codes, respectively; a pen tablet input operation in which the plurality of small regions set in the specific information input region is used as a pattern region adapted to various lines/figures, respectively; and a mouse input operation in which the information input region is used as a coordinate plane.

Further, the touch operation in the information input region is performed by a finger or a pen and the optical sensor is configured to detect a position in the information input region touched by the finger or the pen.

Furthermore, the region setting means is configured to draw and display the specific information input region and the input mode switching region on the information input region of the substrate or on a sheet mounted on the information input region. Note that the substrate preferably includes a piezoelectric device overlaid on the information input region and detecting pressure of the selective touch operation in the information input region, and the input processing unit is preferably configured to include a function for finding out the pressure detected by the piezoelectric device as a writing pressure information.

According to the optical input device having the above-mentioned configuration, the information input region can be selectively switched as a region for the keyboard input operation, a region for the pen tablet input operation and a region for the mouse input operation by only a simple operation to touch the input mode switching region that defines the information input region and is set on the substrate. Accordingly, the role of the information input region set on the substrate is changed so that the information can be input in the form depending on the type of information to be input. In particular, it is only necessary to detect the touched position in the information input region by the optical sensor so that the configuration is simple and the cost of equipment can be reduced.

The optical input devices according to the embodiments are described below in more detail with reference to the appended drawings FIG. 1 to FIG. 6.

DETAILED DESCRIPTION

Embodiments of the present invention are described with reference to the drawings appended herein after.

The present embodiments provide an optical input device having multiple functions capable of arbitrarily selecting an input mode depending on the type of the information to be input so as to input the information.

In other words, the optical input device according to the present embodiments includes a function for switching the input mode. Although the device is a single input device, the information input mode is selectively switched to a keyboard input mode, a pen tablet input mode and a mouse input mode with simple operation. This allows the information input mode depending on the type of the information.

Figure 1:
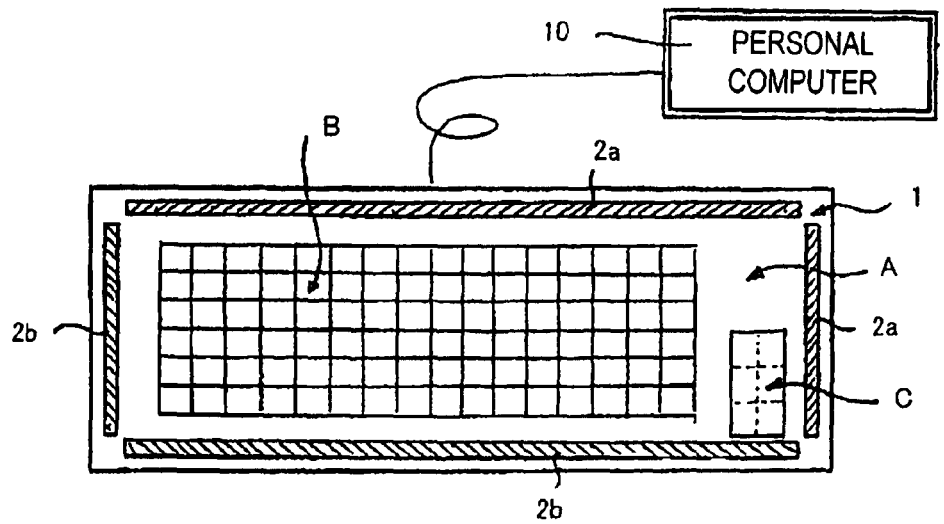
FIG. 1 is a view illustrating a general schematic configuration of an optical input device according to an embodiment.

In FIG. 1, the reference numeral 1 denotes a rectangular substrate defining an information input region (touch panel) A by a touch operation. The touch operation in the information input region A of the substrate 1 is done by the finger of an operator who inputs information to a personal computer (PC) 10 by using the input device or a pen held by the operator. Especially, optical sensors 2 are placed at the four sides of the substrate 1. The optical sensors 2 optically scan the information input region A to detect the position selectively touched by the finger, the pen or the like in the information input region (touch panel) A on the substrate 1.

Here, the optical sensors 2 include linear light sources 2a and linear light receiving devices (one-dimensional sensors) 2b. The linear light sources 2a emit near-infrared light, for example. The light receiving devices 2b are oppositely placed to the light sources 2a to receive the light emitted from the light sources 2a. The light sources 2a are placed at one of the long sides and the short sides of the substrate 1, and the light receiving devices (one-dimensional sensors) 2b are placed at the corresponding long side and short side so as to be opposite to the respective light sources 2a. The optical sensors 2 have a function for using the event where the light emitted from the light sources 2a is partially blocked by the finger or the pen touching the information input region A of the substrate 1 so as to detect the position in the information input region A touched by the finger or the pen according to the output of the light receiving devices (line sensors) 2b. Thus, the substrate 1 provided with the optical sensors 2 functions as an information input device or as a so-called touch panel.

Note that, of course, a reflective photo sensor also may be used, although described herein is a transmitting photo sensor where the light sources 2a are oppositely placed to the light receiving devices (line sensors) 2b through a detecting region (information input region A). The reflective photo sensor detects, by the light receiving devices (line sensors) 2, the light emitted from the light sources 2a and reflected from the finger or the pen touching the information input region A of the substrate 1 so as to detect the position in the information input region A touched by the finger or the pen. In the reflective photo sensor, it is apparent that the light sources 2a and the light receiving devices (line sensors) 2b detecting the reflected light from the light sources 2a are placed side by side at one of the sides of the substrate 1.

Figure 2:
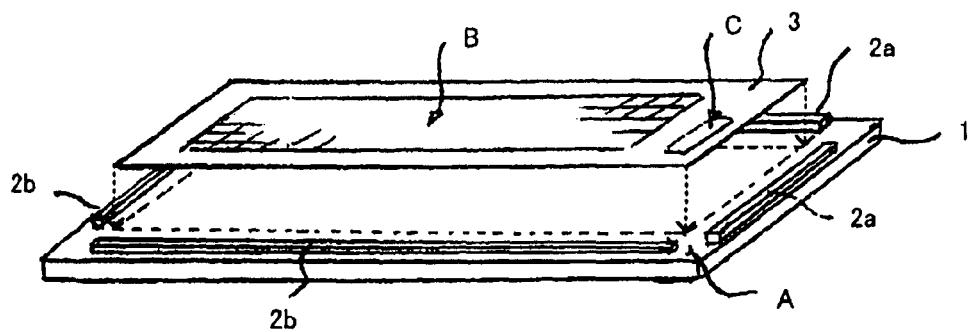
FIG. 2 is an exploded perspective view of a touch panel section of the optical input device illustrated in FIG. 1.

A specific information input region B and an input mode switching region C are set in the information input region A on the substrate 1 to be visible to the user of the input device. The specific information input region B specifies the information to be input. The input mode switching region C is used for changing the information input mode. The specific information input region B and the input mode switching region C are displayed by drawing (printing), on the substrate 1, patterns specifying each of the regions B and C. Alternatively, as shown in FIG. 2, the specific information input region B and the input mode switching region C are displayed, for example, by overlaying a sheet 3 on the information input region A of the substrate 1. The patterns specifying each of the regions B and C are drawn (printed) on the sheet 3.

Here, the specific information input region B specifying the information to be input individually includes a plurality of aligned small regions previously corresponded to various characters/codes, respectively. The aligned regions specifying the plurality of small regions are, for example, a key alignment pattern (keyboard section) and a symbol alignment pattern (pen tablet section) described below. The key alignment pattern has a plurality of aligned keys (small regions) forming a keyboard for inputting the characters/codes. The symbol alignment pattern has a plurality of aligned symbol marks (small regions) forming a pen tablet for inputting lines/figures.

Here, the key alignment pattern and the symbol alignment pattern may be displayed side by side in the information input region A by dividing the specific information input region B. However, it is preferable that the key alignment pattern and the symbol alignment pattern be selectively displayed in the information input region A. Specifically, for example, the key alignment pattern may be printed on the substrate 1 to be usually displayed on the information input region A while the sheet 3 printed with the symbol alignment pattern may be overlaid on the substrate 1 to display the symbol alignment pattern on the information input region A instead of the key alignment pattern printed on the substrate 1. The relationship between the key alignment pattern and the symbol alignment pattern may be reversed. Alternatively, the sheet 3 printed with the key alignment pattern (keyboard) and the sheet 3 printed with the symbol alignment pattern (pen tablet) may be separately prepared and are selectively overlaid on the substrate 1 so that one of the alignment patterns can be displayed on the information input region A.

Note that the above-mentioned key alignment pattern forming the keyboard for inputting characters/codes can be aligned in "QWER" type order meeting the Japanese Industrial Standards (JIS) and also can be aligned in the Japanese alphabet order, the alphabetical order, or the like. Of course, the key alignment pattern is not only for inputting Japanese or English but also may be adapted to various languages. Further, the sheets 3 printed with the different types of the key alignment patterns may be prepared so that the sheets 3 can be selectively used.

While the specific information input region (keyboard section/pen tablet section) B extends widely to cover nearly the whole information input region (tablet section) A, the input mode switching region C is fixed at the corner of the information input region A, for example, at a lower right portion as shown in FIG. 1. The input mode switching region C is region for selecting the input mode of information input through the region B among a plurality of previously set input modes. The input mode switching region C may be divided into a plurality of small regions each corresponding to the plurality of input modes. The input mode switching region C also may be one region with which one of the plurality of input modes is selected based on the number of touch operations.

Note that the plurality of input modes includes (1) a keyboard input operation where the above-mentioned key alignment pattern is displayed on the specific information input region B so that the region B is used as an ordinary keyboard for directly inputting the characters/codes, (2) a pen tablet input operation where the above-mentioned symbol alignment pattern is displayed on the specific information input region B so that the region B is used for selecting and designating the lines/figures for directly inputting the lines/figures, and (3) a mouse input operation where the whole information input region A is used as a coordinate plane to input the position information and the position displacement information.

The above-mentioned touch panel has the optical sensors 2 and the information input region A on the substrate 1. The touch panel is used as the information input device connected to the personal computer (PC) 10 to input the information to the personal computer (PC) 10 as described above. The PC connected to the touch panel has a function for detecting the touched position in the information input region A as the input position information according to the output of the optical sensors 2.

More specifically, the PC 10 includes an input mode switching unit and an input processing unit. The input mode switching unit selects among the plurality of preset input modes an input mode of the information through the information input region A by detecting the touch operation in the input mode switching region C. The input processing unit finds out, from the detected position information, the information input by the touch operation in the information input region A according to the input mode set by the input mode switching unit. The input mode switching unit and the input processing unit are provided as software programs incorporated in the PC 10. The software programs are executed in an operating unit 11 of the PC 10 to implement each of the above-mentioned functions.

Figure 3:
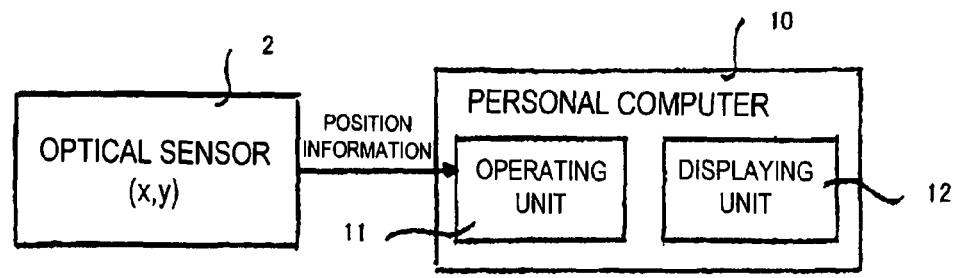
FIG. 3 is a view illustrating a general configuration of the optical input device illustrated in FIG. 1.
Figure 4:
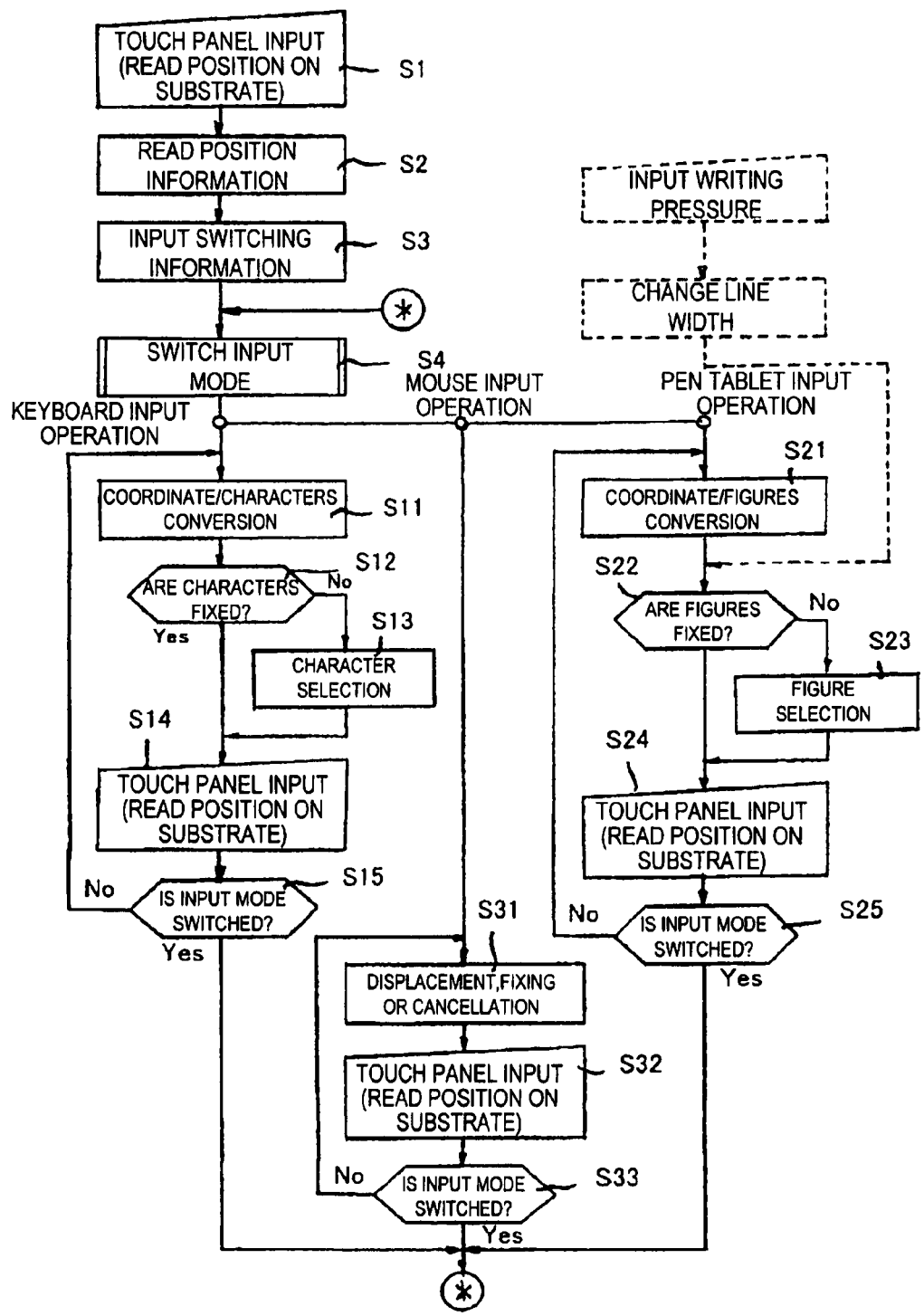
FIG. 4 is a flowchart of the whole processes of the optical input device illustrated in FIG. 1.

More specifically, the PC 10 connected to the input device (touch panel) having the above-mentioned configuration has a process function for detecting the touched position in the information input region A by analyzing the output of the optical sensors 2 in the operating unit 11, and finding out and importing the input information according to the selected input mode, as shown in FIG. 3. Further, the PC 10 determines whether the detected position (touched position) is in the above-mentioned input mode switching region C in response to the detected position, as described below with reference to FIG. 4. If the detected position is in the input mode switching region C, the PC 10 selectively switches the above-mentioned information input modes (input mode switching unit). If the detected position is not in the input mode switching region C, the PC 10 analyzes the touched position in the information input region A according to the information input mode which has been selected at that time and inputs the information according to the information input mode (input processing unit). The information input in such a manner is sequentially displayed on a displaying unit 12 included in the PC 10 and is used for controlling the display too.

Such a process of inputting the information will be explained in more detail. As the schematic steps shown in FIG. 4, the touch operation on the touch panel is detected <step S1> and the touched position information (coordinate) is obtained from the output of the optical sensors 2 <step S2>. Then, if the detected position is in the input mode switching region C <step S3>, the information input mode is selectively switched by the information input to the input mode switching region C at that time <step S4>. If the input mode switching region C is divided into a plurality of small regions in accordance with a plurality of information input modes, the information input mode is selected by determining which region contains the touched position.

Note that in the case where the input mode switching region C is not divided as described above and the control program is configured to select the information input mode based on the number of touch operations, the number of touch operations, for example, that are sequentially done during the predetermined period is counted and then the information input mode is selected among the information input modes previously set in response to the number of touch operations <step S4>.

Then, if the keyboard input operation is selected as the information input mode in this manner, the small region (keys) containing a position coordinate in the specific information input region B is specified from the position coordinate detected from the output of the optical sensors 2 <step S11> so as to find out the characters/codes information previously assigned to each of the small region (keys). If Japanese characters are input, sequentially-input characters or a string of the input characters which is organized as a unit are converted from hiragana to kanji, for example, to fix the information of the input characters or the string of the input characters <step S12>. Note that in the case where the information of the input characters cannot be fixed due to their homonyms, a process for selecting characters is appropriately performed, as typically seen in Japanese word processors, so as to fix the input characters <step S13>.

Having input the characters/codes information by the keyboard operation as described above, the touch operation on the touch panel is detected again <step S14>. Then, whether the detected position is in the input mode switching region C is checked. If the input mode switching region C is not designated, in other words, if the change of the information input mode is not required <step S15>, the above-mentioned processes from step S11 are repeated. In other words, the keyboard region set in the specific information input region B is used to repeatedly input the characters/codes. Note that in the case where the detected position on the touch panel is in the input mode switching region C, the process goes back to the above-mentioned step S4 and the change of the information input mode is implemented.

On the other hand, if the pen tablet input operation is set as the information input mode, the small region (symbol mark) containing a position coordinate in the specific information input region B is specified from the position coordinate detected in the output of the optical sensors 2 <step S21> so as to find out the lines/figures information previously assigned to each of the small region (symbol mark). Then, it is judged if the lines/figures to be input are determined <step S22>. If the lines/figures are not determined due to input information shortage or the like, the lines/figures to be input are determined by inputting another piece of selected information, for example <step S23>.

Having input the lines/figures information by the pen tablet input operation described above, the touch operation on the touch panel is detected again <step S24> in the same manner as in the above-mentioned keyboard input operation. Then, it is checked whether the detected position is in the input mode switching region C. If the input mode switching region C is not designated, in other words, if the change of the information input mode is not required <step S25>, the above-mentioned processes from step S21 are repeated. Then, the symbol mark region set in the specific information input region B is used to repeatedly input the lines/figures. Note that in the case where the detected position on the touch panel is in the input mode switching region C, the process goes back to the above-mentioned step S4 and the change of the information input mode is implemented.

Note that in the case where the mouse input operation is set in the above-mentioned process of setting the information input mode, the touched position information (coordinate) in the information input region A is detected and also, for example, the displacement of the position information of the touch operation is detected according to the output of the optical sensors 2. At the same time, the instruction information for displacement, fixing, cancellation or the like is obtained in response to the mouse operation <step S31. Then, the position information and the instruction information for displacement, fixing, cancellation or the like obtained by the mouse operation are directly input to the PC 10.

After the information for displacement, fixing, cancellation or the like is input by the mouse input operation in such a manner, the touch operation on the touch panel is detected again <step S32> in the same manner as in the above-mentioned keyboard input operation and pen tablet input operation. Then, it is checked whether the detected position is in the input mode switching region C. If the input mode switching region C is not designated, in other words, if the change of the information input mode is not required <step S33>, the above-mentioned processes from step S31 are repeated to repeat the mouse input operation. Note that in the case where the detected position on the touch panel is in the input mode switching region C, the process goes back to the above-mentioned step S4 and the change of the information input mode is implemented.

As described above, according to the device according to the embodiments of the present invention, the role as the information input function is selectively set according to the type of the information to be input to the PC 10. The role of the information input region B on the substrate 1 is determined by the touch operation in the input mode switching region C defined on the substrate 1. This allows selective use of the information input region B as a keyboard region, a pen tablet region, or a mouse region. Thus, the information input region B is effectively used so that the information can be input in an appropriate input mode according to the type of the information to be input. In other words, the single information input region B that does not physically change can be used in common among the keyboard input for characters/codes, the pen tablet input for lines/figures, and also the easy mouse information input.

In particular, according to the device according to the embodiments, it is only necessary to detect the touched position in the information input region A by the optical sensors 2, thus the configuration is simple and the cost of equipment can be reduced. It is not necessary to separately prepare a keyboard device, a pen tablet device, and a mouse. Accordingly, it is also not necessary to switch the connection of these devices. This makes it possible to advantageously save the space for installation. Further, the relationships between the plurality of key alignment pattern forming the keyboard operation surface and characters/codes, and between the plurality of symbol alignment pattern forming the pen tablet operation surface and lines/figures can be appropriately changed on the input control program so that various information input specifications can be easily handled.

Furthermore, in contrast to the PC 10 including an optical or capacitive touch sensor in the surface of the displaying unit (display) 12, there is not a problem in that the information displayed on the surface of the displaying unit (display) 12 is concealed with a finger or the like. This protects the displaying unit (display) 12 from dirt and damage. Furthermore, the touched position is optically detected so that there is not a restriction in that the information is preferably input with bare fingers unlike the case for using a capacitive panel substrate, and there is an advantage, for example, in that the touch operation can be done with gloved fingers at various work sites or with a writing tool (pen) widely used.

Figure 5:
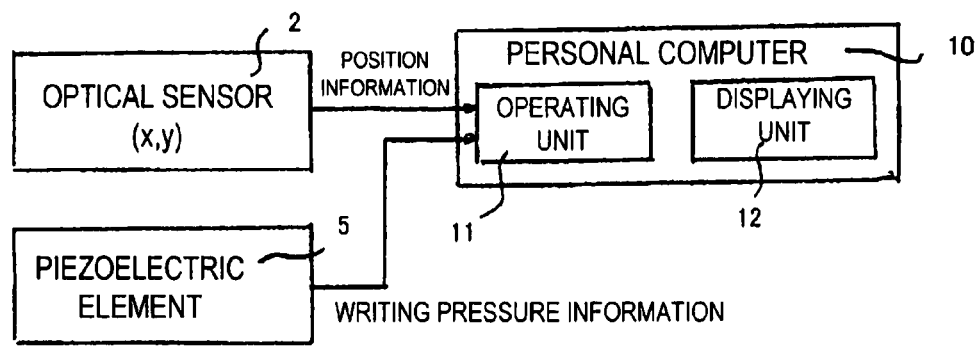
FIG. 5 is a view illustrating a schematic configuration of the main sections of an optical input device according to another embodiment.

Note that the present invention is not limited to the above-mentioned embodiments. For example, a sheet-shaped piezoelectric device 5 is overlaid with the information input region A of the substrate 1 and can be configured to detect the pressure (writing pressure) of the finger or the pen touching the input region A together with the above-mentioned touched position, as shown in FIG. 5. In such a case, for example, the thickness of the line of the characters/codes, particularly those brush-written, input by a keyboard or the thickness of the lines/figures input by a pen tablet can be changed by using the detected writing pressure information.

Figure 6:
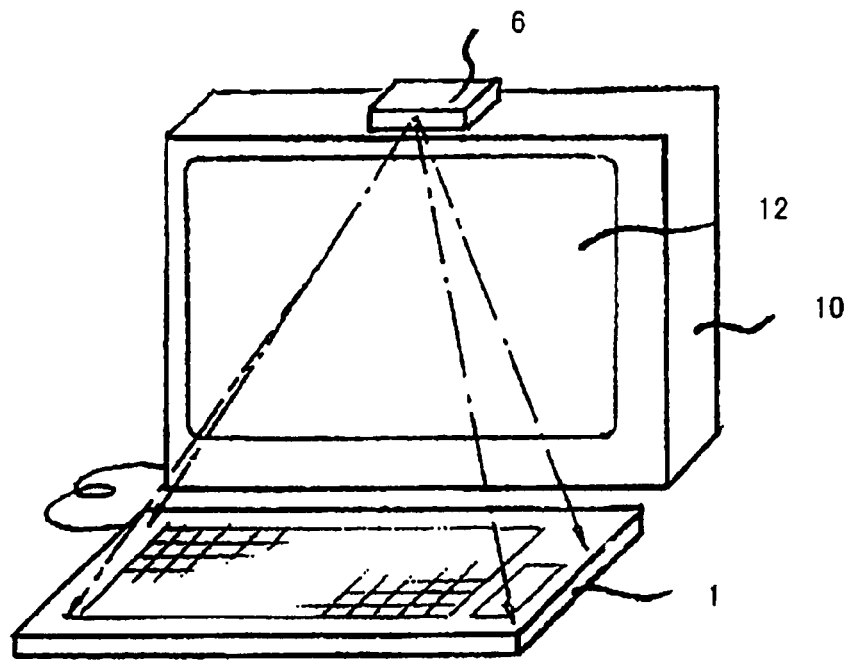
FIG. 6 is a view illustrating a schematic configuration of the main sections of an optical input device according to still another embodiment.

Further, in place of the above-mentioned one-dimensional line-shaped optical sensors 2, a two-dimensional area optical sensor 6 can be used to detect the touched position on the information input region A. In such a case, the area optical sensor 6 may be provided above the displaying unit (display) 12 incorporated in the PC 10 to view (overview) the whole of information input region A, as shown in FIG. 6. In such a case, the above-mentioned piezoelectric device is preferably used in conjunction with the area optical sensor 6 to detect the touch (abutment or pressure) to the information input region A by the finger or the pen. This preferably allows the touch operation itself to be certainly detected.

Further, for example, a plastic material, which is low in cost and printable thereon, is preferably used as the constituent material of the substrate 1. Of course, other materials can be used. In addition, the present invention can be variously changed without departing from the scope of the invention.

What is claimed is:

1. An optical input device comprising:
    a substrate which defines an information input region by a touch operation;
    an optical sensor which optically scans the information input region and detects a selectively touched position on the substrate;
    a region setting unit which sets, in the information input region, a specific information input region individually specifying information to be input and an input mode switching region used for changing an information input mode, and displays each of the regions to be visible;
    an input mode switching unit which detects the touch operation in the input mode switching region according to an output of the optical sensor, and selects and sets an input mode of information through the information input region from a plurality of preset input modes; and
    an input processing unit which analyzes the output of the optical sensor according to the input mode set in the input mode switching unit to find out the information input by the touch operation in the information input region.

2. The optical input device according to claim 1, wherein the plurality of input modes comprises:
    a keyboard input operation in which a plurality of small regions set in the specific information input region is used as a keyboard region adapted to each of various characters/codes;
    a pen tablet input operation in which the plurality of small regions set in the specific information input region is used as a pattern region adapted to each of various lines/figures; and
    a mouse input operation in which the information input region is used as a coordinate plane.

3. The optical input device according to claim 1, wherein the touch operation in the information input region is done by a finger or a pen, and
    the optical sensor detects a position in the information input region touched by the finger or the pen.

4. The optical input device according to claim 3, wherein the optical sensor comprises:
    a linear light source placed on a side of the substrate which emits near-infrared light; and
    a linear light receiving device, placed on the opposite side of the substrate and oppositely to the linear light source, which receives the light emitted from the linear light source.

5. The optical input device according to claim 4, wherein the optical sensor comprises:

an additional linear light source, wherein the linear light source and the additional linear light source are placed on adjacent two sides on the substrate, and an additional linear light receiving device, wherein the linear light receiving device and the additional linear light receiving device are placed on two sides respectively opposite to the adjacent two sides on the substrate.

6. The optical input device according to claim 1, wherein the optical sensor is a two-dimensional sensor for imaging the information input region on the substrate.

7. The optical input device according to claim 1, wherein the region setting unit draws and displays the specific information input region and the input mode switching region on the information input region of the substrate or on a sheet mounted on the information input region.

8. The optical input device according to claim 7, wherein the input mode switching region is divided into a plurality of small regions in accordance with the plurality of information input modes.

9. The optical input device according to claim 8, wherein the input mode switching unit determines which of the plurality of divided small regions contains the selectively touched position on the input mode switching region and determines the information input mode.

10. The optical input device according to claim 9, wherein the input processing unit specifies a small region containing a position coordinate in the specific information input region from the position coordinate detected according to the output of the optical sensor and finds out characters/codes information previously adapted and set to the small regions according to the input mode set in the input mode switching unit.

11. The optical input device according to claim 1, wherein the substrate comprises a piezoelectric device overlaid on the information input region and configured to detect a pressure of the selective touch operation in the information input region, and the input processing unit has a function to find out the pressure detected by the piezoelectric device as writing pressure information.

* * * * *